United States Patent
Perkins

(10) Patent No.: US 9,179,535 B2
(45) Date of Patent: Nov. 3, 2015

(54) NEUTRON GENERATOR

(75) Inventor: Luke T. Perkins, Plainsboro, NJ (US)

(73) Assignee: Schlumberger Technology Corporation, Sugar Land, TX (US)

( * ) Notice: Subject to any disclaimer, the term of this patent is extended or adjusted under 35 U.S.C. 154(b) by 807 days.

(21) Appl. No.: 12/025,096

(22) Filed: Feb. 4, 2008

(65) Prior Publication Data

US 2015/0181688 A1   Jun. 25, 2015

(51) Int. Cl.
  *H05H 3/06* (2006.01)
  *G01V 5/10* (2006.01)
  *G21B 1/11* (2006.01)

(52) U.S. Cl.
  CPC .. *H05H 3/06* (2013.01); *G01V 5/10* (2013.01); *G21B 1/11* (2013.01)

(58) Field of Classification Search
  USPC .......... 376/108, 113–116, 190; 250/251, 253, 250/269.6, 423 R, 505.1; 315/168, 169.1, 315/169.2, 169.3, 169.4, 196.5, 500, 315/505–507; 166/247
  See application file for complete search history.

(56) References Cited

U.S. PATENT DOCUMENTS

| | | | | |
|---|---|---|---|---|
| 2,992,333 | A | * | 7/1961 | Gale .............................. 376/119 |
| 2,998,523 | A | * | 8/1961 | Muench et al. ................ 376/116 |
| 3,015,032 | A | | 12/1961 | Hoyer et al. |
| 3,546,512 | A | | 12/1970 | Frentrop |
| 3,581,093 | A | * | 5/1971 | Carr ............................... 376/116 |
| 3,756,682 | A | * | 9/1973 | Frentrop ......................... 445/40 |
| 3,949,232 | A | | 4/1976 | Langford et al. |
| 4,600,838 | A | | 7/1986 | Steinman et al. |

(Continued)

FOREIGN PATENT DOCUMENTS

EP     158417 A2   10/1985

OTHER PUBLICATIONS

Abstract to Afonin et al., "A compact pulsed electron accelerator with a independent power supply", Instruments and Exeprimental techniques vol. 16, issue 5, pp. 1310-1312, Sep. 1973.*

(Continued)

*Primary Examiner* — Jack W Keith
*Assistant Examiner* — Daniel Wasil
(74) *Attorney, Agent, or Firm* — Michael Dae

(57) ABSTRACT

A neutron generator includes a sealed envelope providing a low pressure environment for a gas of hydrogen isotope(s). One end of the envelope defines an ion source chamber. A target electrode is disposed at the other end of the envelope. An extraction electrode is spaced apart from the target electrode by an accelerating gap. The extraction electrode bounds the ion source chamber. An RF antenna is disposed external to the sealed envelope in the vicinity of the ion source chamber. The RF antenna is used to transmit time-varying electromagnetic fields within the ion source chamber for producing plasma therein. The extraction electrode operates at a positive high voltage potential and the target electrode operates at or near ground potential in order to provide an electric field gradient that accelerates ions of the plasma towards the target electrode to induce collisions of ions with target material, thereby causing fusion reactions that generate and emit neutrons from the target material. High voltage insulation is disposed between the RF antenna and both the ion source chamber and the extraction electrode for electrically insulating the RF antenna operating at or near ground potential from the high voltages of the ion source chamber and the extraction electrode.

53 Claims, 11 Drawing Sheets

(56) References Cited

U.S. PATENT DOCUMENTS

| | | | |
|---|---|---|---|
| 4,721,853 A | | 1/1988 | Wraight |
| 4,725,449 A | * | 2/1988 | Ehlers et al. .................. 427/545 |
| 4,794,792 A | | 1/1989 | Flaum et al. |
| 5,293,410 A | * | 3/1994 | Chen et al. .................... 376/114 |
| 5,313,504 A | | 5/1994 | Czirr |
| 5,517,084 A | * | 5/1996 | Leung ...................... 315/111.81 |
| 5,523,939 A | * | 6/1996 | Stephenson .............. 315/111.01 |
| 5,587,226 A | * | 12/1996 | Leung et al. .................. 428/210 |
| 5,730,219 A | * | 3/1998 | Tubel et al. ..................... 166/64 |
| 5,804,820 A | | 9/1998 | Evans et al. |
| 5,912,460 A | | 6/1999 | Stoller et al. |
| 6,376,978 B1 | * | 4/2002 | Leung et al. ............... 313/359.1 |
| 6,583,553 B2 | * | 6/2003 | Sasaguri ....................... 313/495 |
| 6,870,894 B2 | * | 3/2005 | Leung et al. .................. 376/114 |
| 6,985,553 B2 | * | 1/2006 | Leung et al. .................. 376/158 |
| 7,073,378 B2 | | 7/2006 | Smits et al. |
| 7,342,988 B2 | * | 3/2008 | Leung et al. .................. 376/108 |
| 8,311,186 B2 | | 11/2012 | Perkins |
| 8,321,131 B2 | | 11/2012 | Case |
| 2003/0234355 A1 | * | 12/2003 | Leung et al. .................. 250/251 |
| 2004/0104683 A1 | * | 6/2004 | Leung et al. ............. 315/111.81 |
| 2007/0003780 A1 | * | 1/2007 | Varkey et al. ................. 428/586 |
| 2010/0116510 A1 | * | 5/2010 | Varkey et al. ................. 166/385 |

OTHER PUBLICATIONS

Abstract to Rhee et al., "Circuit description of pulsed power systems", in Proc. 1989 IEEE Particle Accelerator Conference. Accelerator Science and Technology (Cat. No. 89CH2669-0) (1989), vol. 2027, pp. 1954-1956.*

Kim, In Jung et al., Development of D-D Neutron Generator, Nuclear Instruments & Methods in Physics Research, Section B (Beam Interactions with Materials and Atoms) Elsevier Netherlands, vol. 241, No. 1-4, Dec. 2005, pp. 917-920.

Jung, H. D. et al., Development of a Compact Helicon Ion Source for a Neutron Generator, IEEE Conference Record Abstracts 30th International Conference on Plasma Science, Dept. of Nuclear Engineering, Seoul National University, Seoul 151-741, Korea, pp. 1878-1880.

* cited by examiner

NEUTRON GENERATOR

BACKGROUND OF THE INVENTION

1. Field of the Invention

This invention relates to neutron generating systems and more particularly pertains to sealed-tube neutron generators especially adapted to traverse the narrow confines of a well or borehole, although useful in a variety of other applications.

2. The Related Art

The use of a generator of high energy neutrons has been known for a long time for neutron-gamma ray or neutron-neutron logging in oil well logging tools. Accordingly, for illustrative purposes, the invention is described in more complete detail in connection with a sealed-tube neutron generator suitable for use in a well logging tool.

Sealed-tube neutron generators usually have four major features:
(i) a gas source to supply the reacting elements, such as deuterium and tritium;
(ii) an ion source that strips electrons from the gas molecules, thus generating plasma of electrons and positively charged ions;
iii) a target impregnated with deuterium and/or tritium; and
(iv) an accelerating gap which propels the ions from the plasma to the target with such energy that the bombarding ions collide and fuse with the deuterium or tritium nuclei of the target to generate neutrons.

Ordinarily, a plasma of positively charged ions and electrons is produced by energetic collisions of electrons and uncharged gas molecules within the ion source. Two types of ion sources are typically used in neutron generators for well logging tools: a cold cathode (a.k.a. Penning) ion source and a hot (a.k.a. thermionic) cathode ion source. These ion sources employ anode and cathode electrodes of different potential that contribute to plasma production by accelerating electrons to energy higher than the ionization potential of the gas. Collisions of those energetic electrons with gas molecules produce additional electrons and ions.

Penning ion sources increase collision efficiency by lengthening the distance that the electrons travel within the ion source before they are neutralized by striking a positive electrode. The electron path length is increased by establishing a magnetic field which is perpendicular to the electric field within the ion source. The combined magnetic and electrical fields cause the electrons to describe a helical path within the ion source which substantially increases the distance traveled by the electrons within the ion source and thus enhances the collision probability and therefore the ionization and dissociation efficiency of the device. Examples of neutron generators including Penning ion sources used in logging tools are described e.g. in U.S. Pat. No. 3,546,512 or 3,756,682 both assigned to Schlumberger Technology Corporation.

Hot cathode ion sources comprise a cathode realized from a material that emits electrons when heated. An extracting electrode (also called a focusing electrode) extracts ions from the plasma and focuses such ions so as to form an ion beam. An example of a neutron generator including a hot cathode ion source used in a logging tool is described e.g. in U.S. Pat. No. 5,293,410, assigned to Schlumberger Technology Corporation.

In these systems, the target floats at a negative high voltage potential, typically on the order of −70 kV to −160 kV (or less), with the ion source electrodes operating around ground potential, in order to provide the necessary electric field gradient to accelerate ions toward the target with enough energy that the bombarding ions generate and emit neutrons therefrom. Typically, on the order of 10 watts of power are dissipated in the target and the target is surrounded by high voltage insulation. Because of poor thermal conduction to the exterior (due to the fact that electrical insulators are generally poor thermal conductors), the temperature of the target can increase significantly compared to ambient temperature. At high ambient temperature, the target can overheat, leading to failure (loss of neutron output) of the neutron generator.

SUMMARY OF THE INVENTION

The neutron generator of the present invention includes a sealed envelope providing a low pressure environment for a suitable gas of hydrogen isotope(s). One end of the envelope defines an ion source chamber. A target electrode is disposed at the other end of the envelope. An extraction electrode is spaced apart from the target electrode by an accelerating gap. The extraction electrode bounds the ion source chamber. An RF antenna is disposed external to the envelope in proximity to the ion source chamber. A housing surrounds the RF antenna and the sealed envelope. The material of the sealed envelope that defines the ion source chamber (and possibly additional high voltage insulation disposed between the RF antenna and the ion source chamber, as necessary) electrically insulates the RF antenna from high voltages of both the ion source chamber and the extraction electrode (including the electrical connection(s) to the extraction electrode, as necessary). High voltage power supply circuitry is housed with the housing of the neutron generator, preferably adjacent or near the ion source chamber of the sealed envelope, and is electrically connected to the extraction electrode. High voltage insulation surrounds the high voltage power supply circuitry and electrically insulates the housing (and low voltage electrical components housed therein) from the high voltage power supply circuitry. An RF signal generator (which includes an RF signal source and an impedance matching network) is electrically coupled to the RF antenna.

During use, a low pressure gas of deuterium and/or tritium is provided in the sealed envelope. The RF signal generator drives the RF antenna with excitation signals such that the RF antenna transmits time-varying electromagnetic fields within the ion source chamber of sufficient magnitude and suitable frequency for producing plasma in the ion source chamber. The high voltage power supply circuitry operates the extraction electrode such that the extraction electrode floats at a positive high voltage potential (e.g., typically in the range of +70 kV to +160 kV or more). The target electrode operates at or near ground potential. The potential difference between the extraction electrode (positive high voltage potential) and the target electrode (at or near ground potential) provides an electric field gradient over the accelerating gap between the extraction electrode and the target electrode. This potential difference accelerates ions towards the target electrode to induce collisions of ions with target material, thereby causing fusion reactions that generate neutrons.

In an illustrative embodiment, solid-form high voltage insulation is disposed within the housing and surrounds the high voltage power supply circuitry for high voltage insulation of such high voltage power supply circuitry. Such solid-form high voltage insulation is preferably realized by at least one tubular member of perfluoroalkoxy (more preferably realized by two concentric tubular members of perfluoroalkoxy, each having a wall thickness of at least 0.04 inches).

In another illustrative embodiment, solid-form high voltage insulation is disposed within the housing and is realized by a unitary element (i.e., a single piece) including first and second portions without any break in continuity therebetween. The first portion surrounds the high voltage power supply circuitry and the second portion surrounds the sealed envelope. The first portion provides for high voltage insulation of the high voltage power supply circuitry. The second portion is disposed between the RF antenna and both the ion source chamber and extraction electrode (including electrical connector(s) thereto) of the sealed envelope and electrically insulates the RF antenna from high voltages of both the ion source chamber and the extraction electrode. The second portion also preferably extends between the sealed envelope and the housing over a substantial portion of the lengthwise (axial) dimension of the sealed envelope in order to electrically insulate the housing (and low voltage components therein) from high voltages within the sealed envelope. Such solid-form high voltage insulation is preferably realized by at least one tubular member of perfluoroalkoxy (more preferably two concentric tubular members of perfluoroalkoxy, each having a wall thickness of at least 0.04 inches).

Liquid and/or gas electrically insulating materials can also be used to fill the space between the sealed envelope and the housing for high voltage insulating purposes.

The neutron generator of the present invention employs both a grounded target electrode as well as an RF-driven ion source with an external RF antenna that does not make physical contact with the high voltage sealed environment of the device. The grounded target electrode reduces or eliminates the need for high voltage insulation of the target electrode. Because most good high voltage insulators provide poor thermal conduction, the reduction of high voltage insulation for the target electrode facilitates heat removal (cooling). With adequate cooling of the grounded target, run away depletion of the target under high beam operation can be avoided, which allows for sustenance of higher neutron output per unit of power dissipation on the target. Furthermore, with the target electrode operating at or near ground potential, problems associated with electron current leakage from the surfaces of the target electrode are avoided. The external nature of the RF antenna of the RF-driven ion source allows for improved high voltage insulation of the ion source and supporting high voltage components. It also allows for the RF signal generator to operate at ground potential. Moreover, the RF-driven ion source produces high monatomic hydrogen beam fractions which yield significantly more neutrons per unit beam current as compared to conventional (e.g., Penning-type) ion sources.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
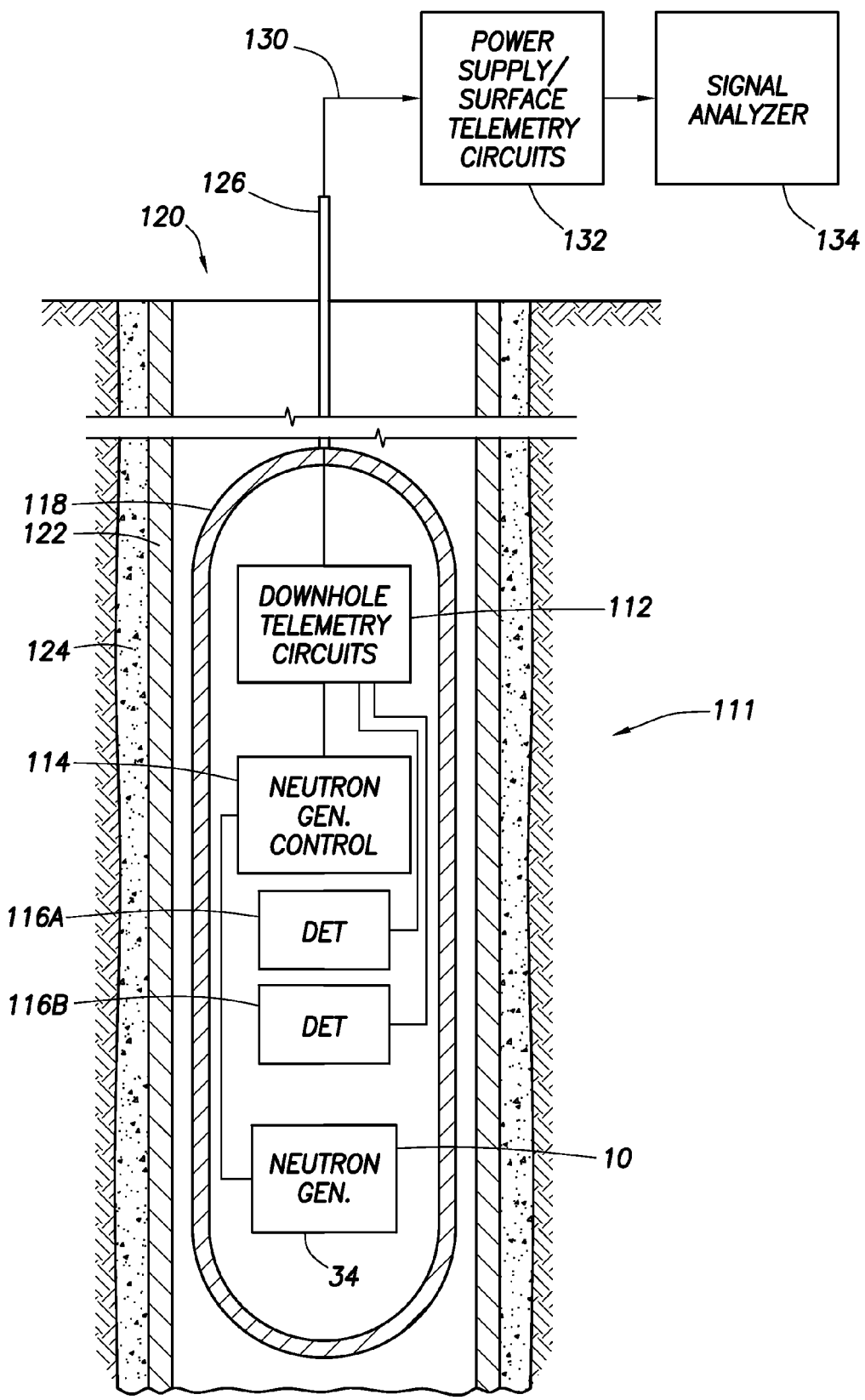
FIG. 1 is a schematic view of an exemplary downhole logging tool and associated surface instrumentation.
Figure 2:
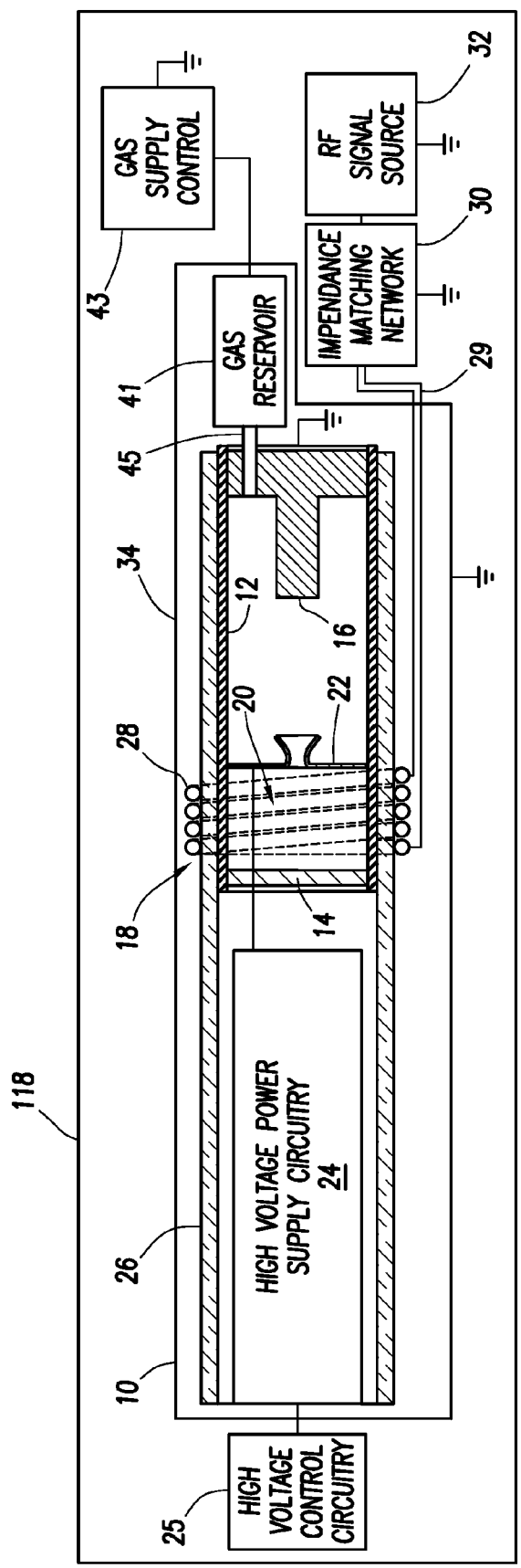
FIG. 2 is a schematic view of a neutron generator of the logging tool of FIG. 1 in accordance with the present invention.

Turning now to FIGS. 1 and 2, the neutron generator 10 in accordance with the present invention may be used as part of a logging tool 111 as shown. The neutron generator 10 includes a sealed hollow cylindrical tube or envelope 12. An RF-driven ion source 18 is disposed at one end of the sealed envelope 12, and a target electrode 16 is disposed at the other end of the sealed envelope 12 as described below in more detail. The sealed envelope 12 and supporting high voltage electrical components are enclosed in a housing 34, which is referred to below as the Neutron Generator (NG) housing 34. The NG housing 34 and supporting low voltage electrical circuit components 114 as well as other system components (e.g., downhole telemetry circuits 112 and at least one radiation detector (for example, two shown as 116A, 116B)) are housed in a sonde 118 that is configured to be moved through a borehole 120. The borehole 120 is illustrated as including a steel casing 122 and a surrounding cement annulus 124, although other borehole configurations (such as open holes) are also typically used in oil well applications. The sonde 118 is typically suspended in the borehole 120 by cable, coiled tubing or other means (labeled 126). Different modes of conveyance of the sonde 118 can be used, including wireline, slickline, tough logging conditions and logging while drilling. The sonde 118 can also be deployed for permanent monitoring. A multi-conductor power supply cable 130 may be carried by the suspension means 126 and to provide electrical power from the surface (by power supply circuitry 132) downhole to the sonde 118 and the electrical components therein, which include the downhole telemetry circuits 112, low-voltage neutron generator support circuitry 114 and radiation detectors 116A, 116B. Alternatively, in other modes of conveyance power may be supplied by batteries and/or a downhole power generator. The neutron generator 10 is operated to emit neutrons in order to irradiate the formation adjacent the sonde 118 with such neutrons. Neutrons and/or photons (gamma-rays) that return from the formation are detected by the radiation detectors 116A, 116B. The outputs of the radiation detectors 116A, 116B are communicated to the surface by cooperation of downhole telemetry circuitry 112 and surface telemetry circuitry 132, and analyzed by signal analyzer 134 to obtain information regarding the formation. The signal analyzer 134 is typically realized by a computer system executing signal analysis software for obtaining information regarding the formation. More particularly, oil, gas, water and the elements of the geological formations possess distinctive radiation signatures that permit identification of such geological formations. Signal analysis can also be carried out downhole within the sonde 118. The neutron generator 10 of the present invention can also be used in conjunction with other logging tools, including, but not limited to those described in U.S. Pat. Nos. 4,794,792; 4,721, 853; and 4,600,838; and 5,313,504, and U.S. Pat. No. 7,073, 378 which are herein incorporated by reference in their entireties.

As shown in FIG. 2, the neutron generator 10 includes a hollow cylindrical envelope 12 made of an insulating material such as quartz, glass or ceramic. A closing plate 14 and the target electrode 16 close the opposite ends of the envelope 12 to provide a sealed environment inside the envelope 12. Gas supply means supplies low pressure gas of deuterium and/or tritium to this envelope 12. In the preferred embodiment, the gas supply means includes a gas reservoir 41 that includes a helically wound filament of metal (such as tungsten) coated with a metal hydride film (such as a hydride of titanium, scandium, and/or zirconium) or the like as is well known. The ends of the filament are connected to gas supply control circuitry 43 that heats (typically by ohmic heating) the filament and the metal hydride film thereon. The filament and the metal hydride film thereon cools when electric current through the filament is turned off or minimized. The heating (or cooling) of the metal hydride film of the filament results in the emission (or absorption) of deuterium and/or tritium in gaseous form to thereby provide a low pressure supply of these gases (typically on the order of 1-100 millitorrs) and to control gas pressure during generator operation. The gas supply circuitry 43 is preferably located in the sonde 118 outside the NG housing 34 and the gas supply reservoir 41 is located inside the NG housing 34 near the target end of the sealed envelope 12. The gas supply circuitry 43 is electrically coupled to the gas reservoir 41 by an electrical feedthrough (not shown) that extends through the NG housing 34. The gas reservoir 41 is fluidly coupled to the sealed envelope 12 by a feed tube 45. The gas reservoir 41 and the gas supply control circuitry 43 operate around ground potential (sometimes referred to as chassis potential), which simplifies the design of the gas supply control circuitry and reduces the need for high voltage insulation of the gas reservoir and supporting electrical components. Alternatively, the gas reservoir 41 can be realized by a non-evaporable getter, such as a sintered porous getter sold commercially by SAES Getters USA Inc. of Colorado Springs, Colo.

An RF-driven ion source 18 is disposed at the end of the envelope 12 adjacent the closing plate 14 and spaced apart from the target electrode 16. The RF-driven ion source 18 includes an ion source chamber 20 defined by a portion of the cylindrical wall of the envelope 12. One side of the ion source chamber 20 is bounded by the closing plate 14. The other side of the ion source chamber 20 is bounded by an extraction electrode 22. A high voltage power supply circuit 24, which is preferably realized by a Cockcroft-Walton voltage multiplier circuit as is well known, is electrically coupled to the extraction electrode 22 preferably by an electrical feedthrough (not shown) in the target plate 14, and operates the extraction electrode 22 such that the extraction electrode 22 floats at a positive high voltage potential during operation as described below.

Solid-form high voltage insulation 26 surrounds the high voltage power supply circuitry 24 and electrically insulates the NG housing 34 (and low voltage electrical components housed therein) from high voltages produced by the high voltage power supply circuitry 24. Control circuitry 25, which operates at low voltages, is housed in the sonde 118 outside the NG housing 34 and interfaces to the high voltage power supply circuit 24 via an electrical feedthrough (not shown) that extends through the NG housing 34. Liquid and/or gas electrically insulating materials (such as SF6 gas or the Fluorinert™ line of insulating liquids sold commercially by the 3M Company of St. Paul, Minn.) can also be used to fill the space between the sealed envelope 12 and the NG housing 34 for high voltage insulating purposes.

An RF antenna 28 is disposed external to the high voltage insulation 26 and in proximity to the ion source chamber 20. In the embodiment shown, the RF antenna 28 is realized by a conductor (e.g., wire or metal tubing such as copper tubing) coiled in a helix geometry that surrounds the ion source chamber 20. Alternatively, the RF antenna 28 can be realized by a conductor (e.g., a wire or metal tubing such as copper tubing) coiled in a pancake geometry (not shown) that is disposed in proximity to the ion source chamber 20. The conductor of the RF antenna 28 can optionally be insulated for electrical insulation between turns of the coil. If cooling of the RF antenna 28 is needed, coolant can be flowed through the coiled metal tubing of the RF antenna 28. The shape and curvature of the coiled conductor of the RF antenna 28, as well as the shape and curvature of the extraction electrode 22 and the ion source chamber 20 itself, are preferably controlled to minimize electrical stress and possible failure of the high voltage insulation system in proximity thereto.

Figure 3:
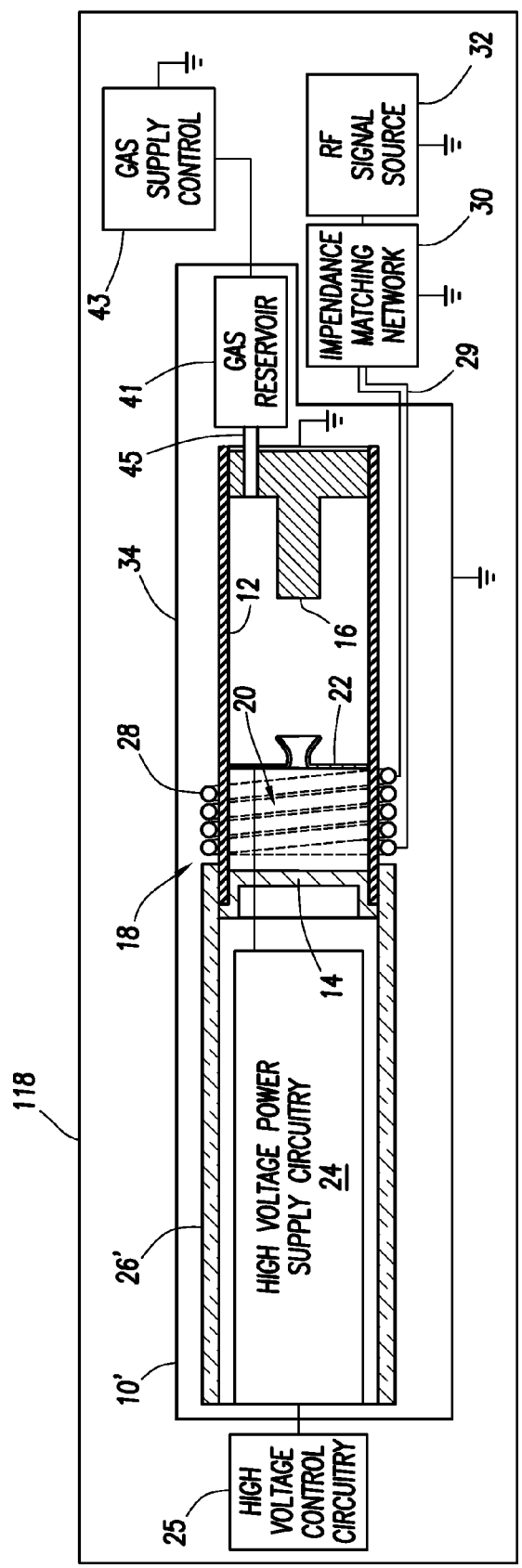
FIG. 3 is a schematic view of a neutron generator of the logging tool of FIG. 1 in accordance with an alternate embodiment of the present invention.

The RF antenna 28 is electrically connected preferably by a coaxial cable 29 to an RF signal generator, which includes an impedance matching network 30 driven by an RF signal source 32, as is well known. The RF impedance matching network 30 matches the output impedance of the RF signal source 32 to the input impedance of the RF antenna 28 and load (including the plasma) in order to maximize power transfer and minimize reflections from the RF antenna 28. The RF impedance matching network 30 and the RF signal source 32 are preferably located in the sonde 118 outside the NG housing 34 near the target end of the sealed envelope 12, and the coaxial cable 29 extends through the NG housing 34 as shown. Note that the scale of FIGS. 2 and 3 is not meant to accurately reflect the size of the components of the system, including the conductors and connectors of the coaxial cable 29 relative to the coils of the RF antenna 28. In this manner, the size of the conductors and connectors of the coaxial cable 29 relative to the coils of the RF antenna 28 can vary from the sizes shown.

The solid-form high voltage insulation 26 also surrounds the sealed envelope 12 and is disposed between the RF antenna 28 and both the ion source chamber 20 and extraction electrode 22 (including electrical connector(s) thereto). The insulating material of the wall(s) of the envelope 12 that defines the ion source chamber 20 as well as the surrounding high voltage insulation 26 electrically insulates the RF antenna 28 from high voltages of both the ion source chamber 20 and the extraction electrode 22. The high voltage insulation 26 also preferably extends between the sealed envelope 12 and the NG housing 34 over a substantial portion of the lengthwise (axial) dimension of the sealed envelope 12 in order to electrically insulate the electrical connections between the RF antenna 28 and the RF signal generator (e.g. coaxial cable 29) as well as to electrically insulate the NG housing 34 from high voltages within the sealed envelope 12. Additional solid-form electrical insulation (e.g., one or more tubular PFA members), which is not shown in FIG. 2, can be disposed between the RF antenna 28 and coaxial cable 29 and the NG housing 34 for insulation purposes.

The target electrode 16 preferably comprises a thin metal hydride film of titanium, scandium, zirconium, erbium, or yttrium deposited on a surface of the target electrode 16 facing the extraction electrode 22. Other suitable targets can also be used. If needed, cooling fluid can be circulated through the target electrode 16 in order to counteract heating that results from operation (e.g., ion bombardment). The target electrode 16 is electrically coupled to ground potential such that it operates at or near ground potential.

During operation of the generator 10, low pressure gas produced by the gas reservoir 41 permeates the space inside the sealed envelope 12 (including the ion source chamber 20). The RF signal generator (the RF impedance matching network 30 and RF signal generator 32) drives the RF antenna 28 with an alternating current excitation signal that causes the RF antenna 38 to transmit time-varying RF electromagnetic fields in the vicinity of the RF antenna 38 (primarily in the ion source chamber 20). The high voltage insulation 26 and the wall(s) of the envelope 12 that define the ion source chamber 20 are realized from material that allow for transmission (with minimum loss) of these RF electromagnetic fields therethrough and into the ion source chamber 20. Such RF electromagnetic fields are made to be sufficient in intensity and/or frequency to strip electrons from gas molecules in the ion source chamber 20 in order to induce ionization and dissociation of the gas therein, thereby producing plasma in the ion source chamber 20 as is well known in the art. The driving frequency of the RF signal source 32 can range from low MHz to hundreds of MHz.

The high voltage power supply circuit 24 (under control of control circuitry 25) supplies a positive high voltage signal to the extraction electrode 22 in a manner whereby the extraction electrode 22 (and the plasma within the ion source chamber 20) floats at positive high voltage levels (e.g., typically in a range between +70 kV to +160 kV or more). The target electrode 16 is electrically coupled to ground potential such that it operates at or near ground potential. This configuration produces a high electric field gradient within the sealed envelope 12 in the accelerating gap between the extraction electrode 22 and the target electrode 16. This electric field gradient impels ions produced at the ion source 18 toward the target electrode 16 with such energy that the bombarding ions collide with deuterium or tritium target nuclei of the target electrode 16, thereby causing fusion reactions that generate neutrons.

In the preferred embodiment, the solid-form high voltage insulation 26 is realized by at least one tubular member of perfluoroalkoxy (PFA), and most preferably realized from two or more concentric PFA tubular members each having a wall thickness of at least 0.04 inches. Other solid-form electrically insulating materials can be used as a replacement or in combination with the high voltage insulation 26. Such solid-form insulating materials can include, but are not limited to, quartz, ceramic, polyethylene, Teflon®, etc.

An alternate embodiment of a neutron generator 10' is shown in FIG. 3. In this alternate embodiment, the high voltage insulation system of the neutron generator as described above is modified to include solid-form high voltage insulation 26' that surrounds the high voltage power supply circuitry 24 and electrically insulates the NO housing 34 (and low voltage electrical components housed therein) from high voltages produced by the high voltage power supply circuitry 24. In the preferred embodiment, the high voltage insulation 26' is realized by at least one tubular member of perfluoroalkoxy (PFA), and most preferably realized from two or more concentric PFA tubular members each having a wall thickness of at least 0.04 inches. Other solid-form electrically insulating materials can be used as a replacement or in combination with the high voltage insulation 26'. Such solid-form insulating materials can include, but are not limited to, quartz, ceramic, polyethylene, etc.

Note that in the embodiment of FIG. 3, the high voltage insulation 26' is not disposed between the RF antenna 28 and both the ion source chamber 20 and the extraction electrode 22 of the sealed envelope 12. In this configuration, the RE antenna 28 is disposed adjacent the wall of the envelope 12 that defines the ion source chamber 20 of the envelope 12, and the insulating material of this wall portion electrically insulates the RF antenna 28 from high voltages of both the ion source chamber 20 and the extraction electrode 22. The high voltage insulation 26' also does not extend between the sealed envelope 12 and the NG housing 34 over a substantial portion of the lengthwise (axial) dimension of the sealed envelope 12 as provided in the embodiment of FIG. 2. In this configuration, the insulating material of the wall(s) of the envelope 12 provides sufficient electrical insulation in order to protect the electrical connections between the RF antenna 28 and the RF signal generator (e.g. coaxial cable 29) as well as the NG housing 34 from high voltages within the sealed envelope 12. Liquid and/or gas electrically insulating materials (such as SF6 gas or the Fluorinert™ line of insulating liquids sold commercially by the 3M Company of St. Paul, Minn.) can also be used to fill the space between the sealed envelope 12 and the NG housing 34 for insulating purposes. Additional solid-form electrical insulation (e.g., one or more tubular PFA members), which is not shown in FIG. 3, can be disposed between the RF antenna 28 and coaxial cable 29 and the NG housing 34 for insulation purposes.

Figure 4:
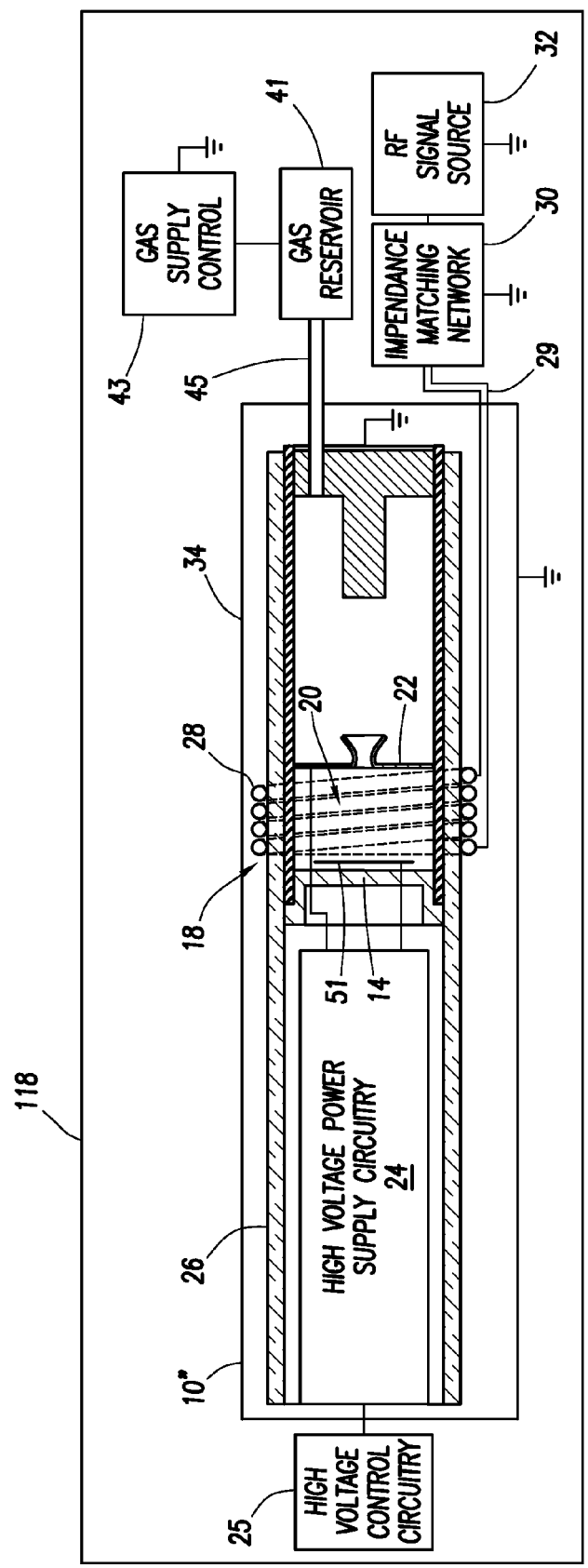
FIG. 4 is a schematic view of a neutron generator of the logging tool of FIG. 1 in accordance with yet another alternate embodiment of the present invention.

The high voltage power supply circuitry 24 and the RF signal generator (i.e., the RF source 32 and impedance matching network 30) of FIGS. 2 and 3 can be adapted to provide controlled output of ions continuously (e.g., DC or CW continuous output mode) or in recurrent bursts (e.g., a pulsed output mode). Pulsed output mode can be achieved by applying pulsed-mode excitation signals to the RF antenna 28. Alternatively, pulsed output mode can be achieved by applying continuous-mode excitation signals to the RF antenna and applying pulsed mode signals to the extraction electrode 22. The pulsed mode signals cause the extraction electrode 22 to float at potentials greater than steady state plasma potential. The voltage potential applied to the extraction electrode 22 is i) greater than the steady state plasma potential in the OFF mode and ii) less than (or near) the steady state plasma potential in the ON mode. The voltage potential applied to the extraction electrode in the OFF mode inhibit extraction of ions and is typically a positive voltage of several volts with respect to the inside surface of closing plate 14. The voltages applied to the extraction electrode in the ON mode allows for extraction of ions and is typically voltage ranging from slightly positive to several 10 V negative with respect to the potential at the inside surface of the closing plate 14. The ON and OFF mode voltage potentials depend on the geometry and the electric fields in the vicinity of the extraction electrode as well as on the plasma ion density. This steady state plasma potential can be better defined/influenced by an optional plasma electrode 51 that is disposed within the ion source chamber 20 as shown in the embodiment of FIG. 4. The high voltage power supply circuitry 24 (e.g., the DC power supply circuitry 77 as described below), which interfaces to the plasma electrode 51 preferably by an electrical feedthrough (not shown) in the closing plate 14, is adapted to generate and output a suitable DC voltage signal that floats the plasma electrode 51 at the desired potential. The structure and operation of the neutron generator 10'' of FIG. 4 is similar to that described above with respect to the embodiment of FIG. 2.

For pulsed mode output, the high voltage power supply circuitry 25 preferably employs a Cockcroft-Walton HV ladder 71 as shown in FIGS. 5, 6, 7A and 7B, which is preferably located inside the NG housing. An AC source 73, preferably located outside the NG housing 34, is operated to drive the HV ladder 71 through an HV transformer 75 as is well known. The HV ladder 71 produces a positive high voltage signal for floating the extractor electrode 22 at the positive high voltage potentials as described herein. The positive high voltage signal produced by the HV ladder 71 is supplied to a DC power supply circuit 77 that floats at such positive high voltage potentials. The DC power supply circuitry 77 generates a DC voltage supply signal that is superimposed on the positive high voltage potentials produced by the HV ladder 71. The DC voltage supply signal generated by the DC power supply circuitry 77 is output to pulsed-mode circuitry 79, which operates to drive the extraction electrode 22 with pulsed output signals that are derived from the DC voltage supply signal supplied thereto.

For pulsed mode output, the DC power supply circuitry 77 is preferably supplied with an input AC signal that is transformed to the desired DC voltage supply signal superimposed on the positive high voltage potentials produced by the HV Ladder 71. Various mechanisms can be used to generate the input AC signal inside the high voltage environment of the high voltage power supply circuitry 24 under control from outside the high voltage while maintaining high voltage standoff of the high voltage environment.

Figure 5:
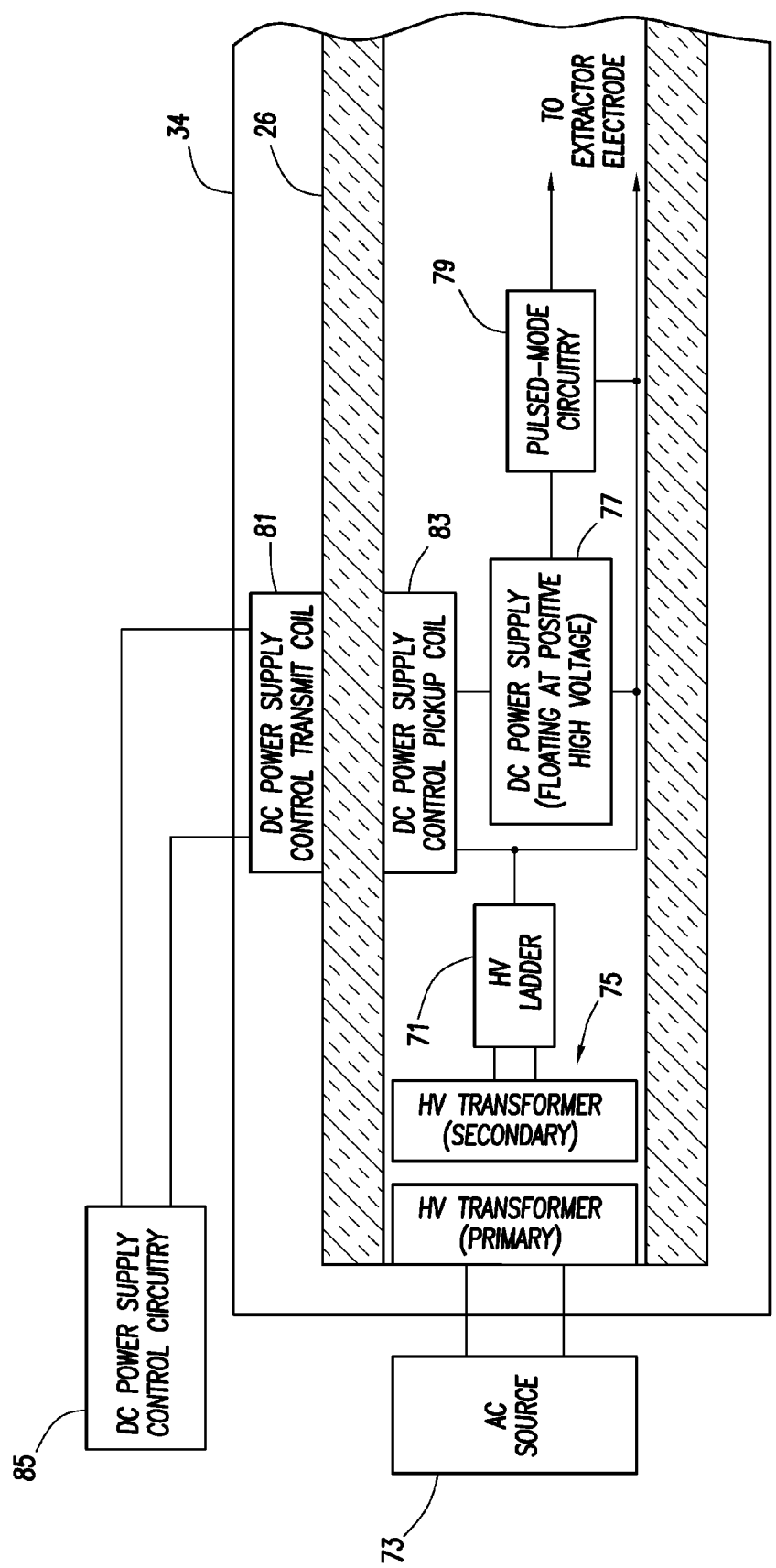
FIG. 5 is a schematic view of an embodiment of high voltage power supply circuitry and supporting control circuitry for use in the neutron generators of FIGS. 1-4.

For example, in the embodiment shown in FIG. 5, the input AC signal is generated by an inductive interface between a transmitter coil 81 located outside the high voltage environment (i.e., located outside the high voltage insulation 26 and within the NG housing 34) and a pickup coil 83 located within the high voltage environment. The transmitter coil 81 is coupled to low-voltage control circuitry 85 that is preferably located outside the NG housing 34. The pickup coil 83 is coupled between the output of the HV ladder 71 and the DC power supply circuit 77. The control circuitry 85 generates an AC signal that is supplied to the transmitter coil 81, which induces an AC signal in the pickup coil 83 via the inductive interface therebetween for supply to the DC power supply circuit 77.

Figure 6:
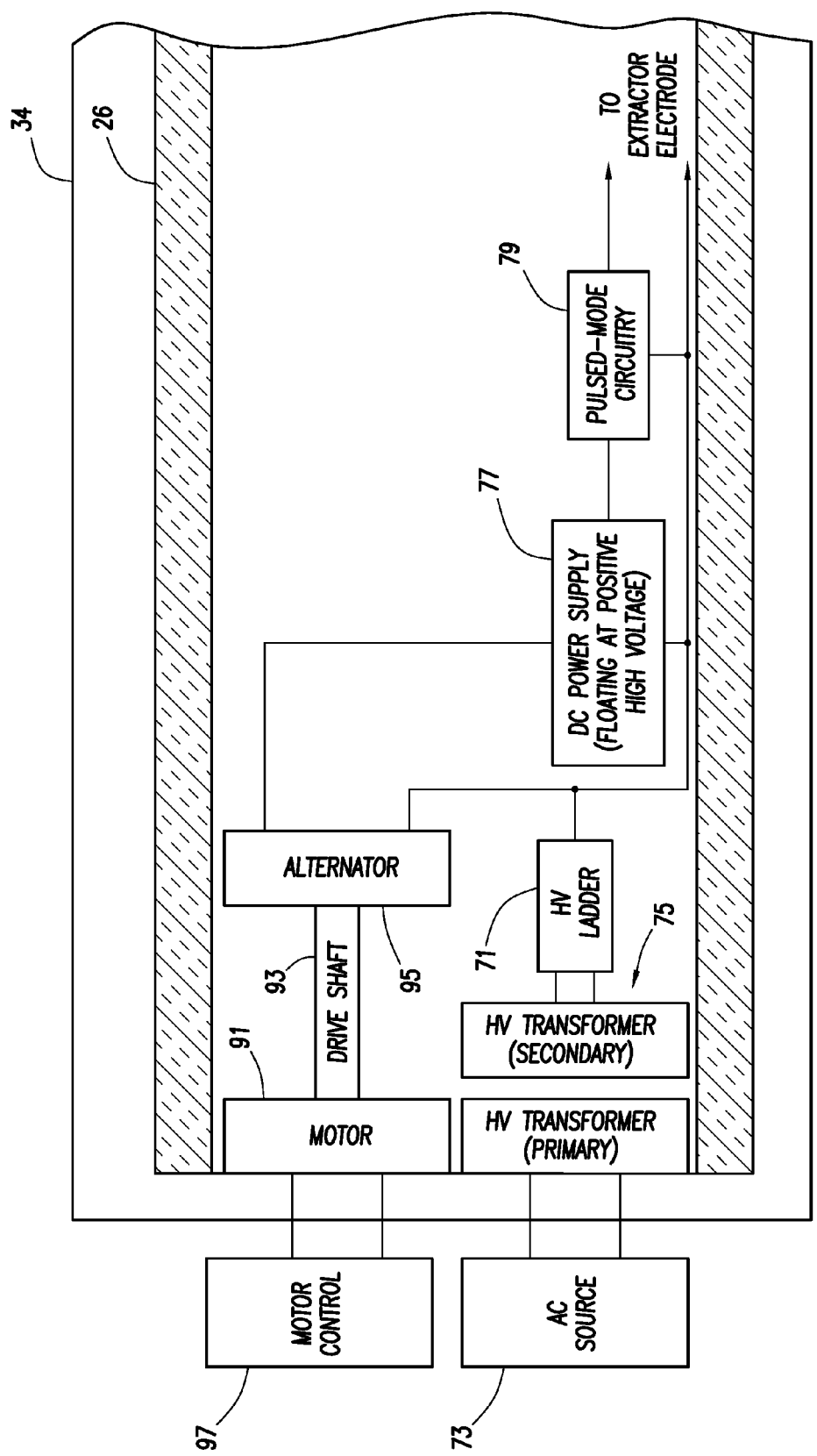
FIG. 6 is a schematic view of another embodiment of high voltage power supply circuitry and supporting control circuitry for use in the neutron generators of FIGS. 1-4.

In another embodiment shown in FIG. 6, a motor 91 operating outside the high voltage environment and preferably disposed within the NG housing 34 drives an electrically insulated shaft 93 coupled to an alternator 95 operating inside the high voltage environment (i.e., located within the interior space defined by the high voltage insulation 26). The alternator 95 is coupled between the output of the HV ladder 71 and the DC power supply circuit 77. The output of the alternator 95 generates the input AC signal for supply to the DC power supply circuitry 77. The motor 91 is controlled by low voltage control circuitry 97 that is preferably located outside the NG housing 34.

Figure 7A:
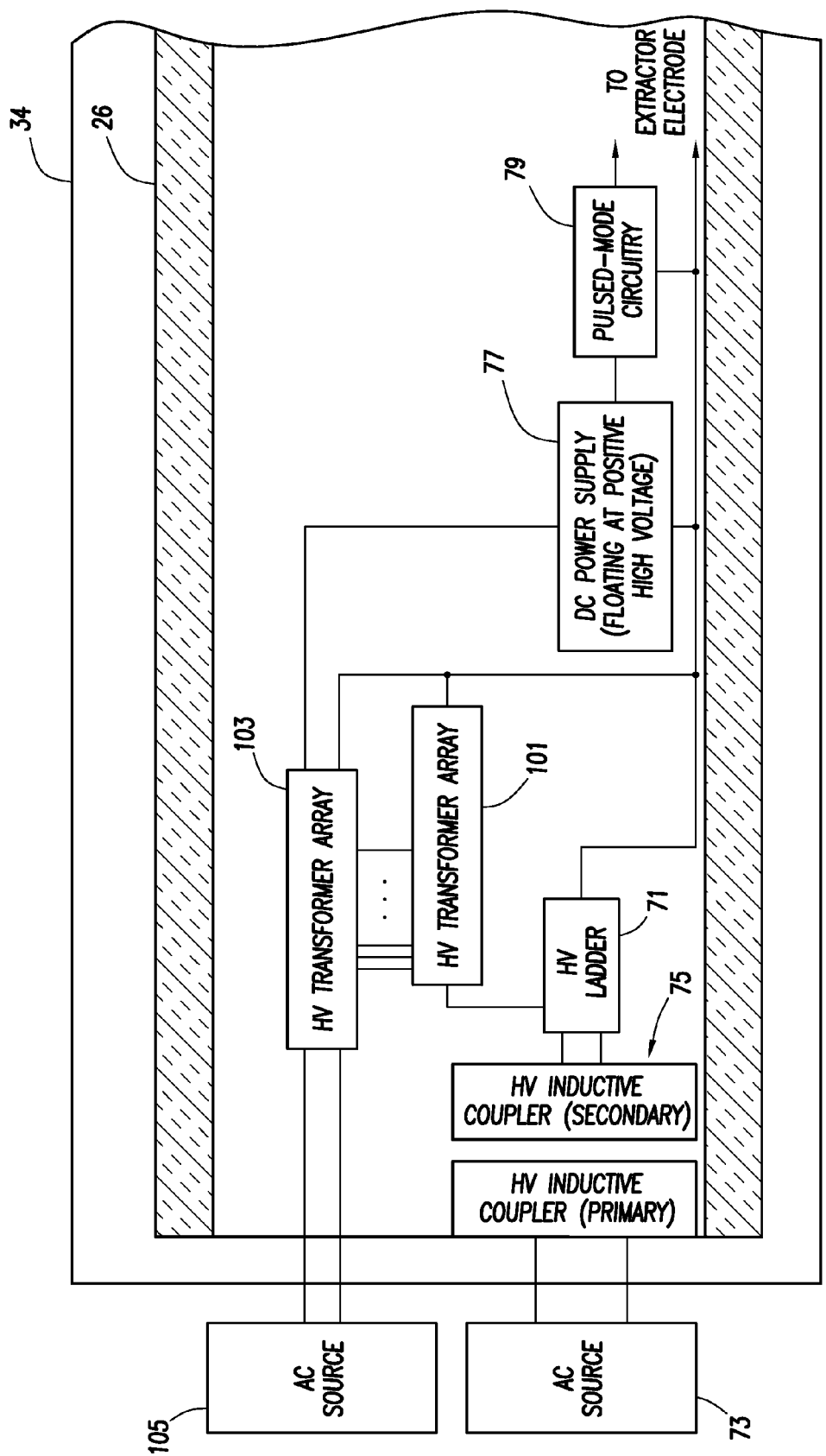
FIG. 7A is a schematic view of yet another embodiment of high voltage power supply circuitry and supporting control circuitry for use in the neutron generators of FIGS. 1-4.
Figure 7B:
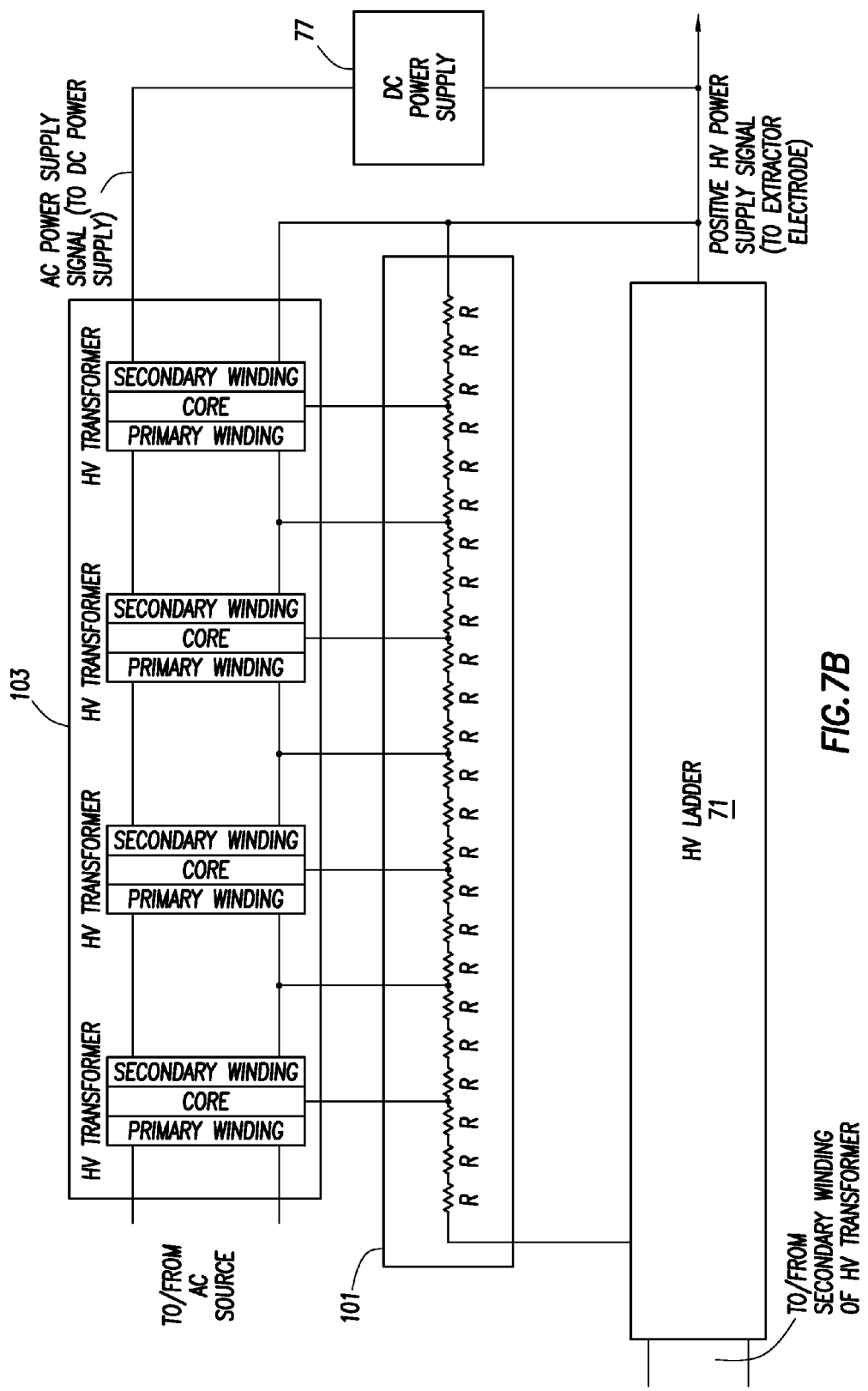
FIG. 7B is a block diagram of the high voltage power supply circuitry of FIG. 7A.

In yet another embodiment shown in FIGS. 7A and 7B, a resistive divider network 101 is located in the high voltage environment (i.e., located within the interior space defined by the high voltage insulation 26) and coupled to the output of the HV ladder 71. A linear array of small-size transformers 103 is also disposed inside the high voltage environment. The transformers of the array 103 are preferably constructed from small-size cores (which can be realized from an amorphous metallic alloy for greater efficiency) with primary and secondary windings fabricated from small diameter high voltage cable. The input of the transformer array 103 is coupled to an AC signal source 105 located outside the high voltage environment (preferably located outside the NG housing 34). The secondary windings of the transformers of the array 103 (except for the last transformer) are coupled to the primary windings of the next transformer in the array as well as to nodes along the resistor divider network 101 as best shown in FIG. 7B. The cores of the transformer array 103 are also coupled to nodes along the resistive divider network 101 as best shown in FIG. 7B. The transformer array 103 produces an AC signal that is supplied to the DC power supply circuitry 77. The AC signal output by the transformer array 103 is controlled by the operation of the AC source 105, which is preferably located outside the NG housing 34. Advantageously, the individual transformers of the linear array 103 have reduced high voltage standoff requirements as the high voltage potential of the environment is distributed across the transformers of the array. These reduced standoff requirements enable the transformers to be reduced in size, which is advantageous for space-constrained environments such as in logging tools as described herein.

Figure 8:
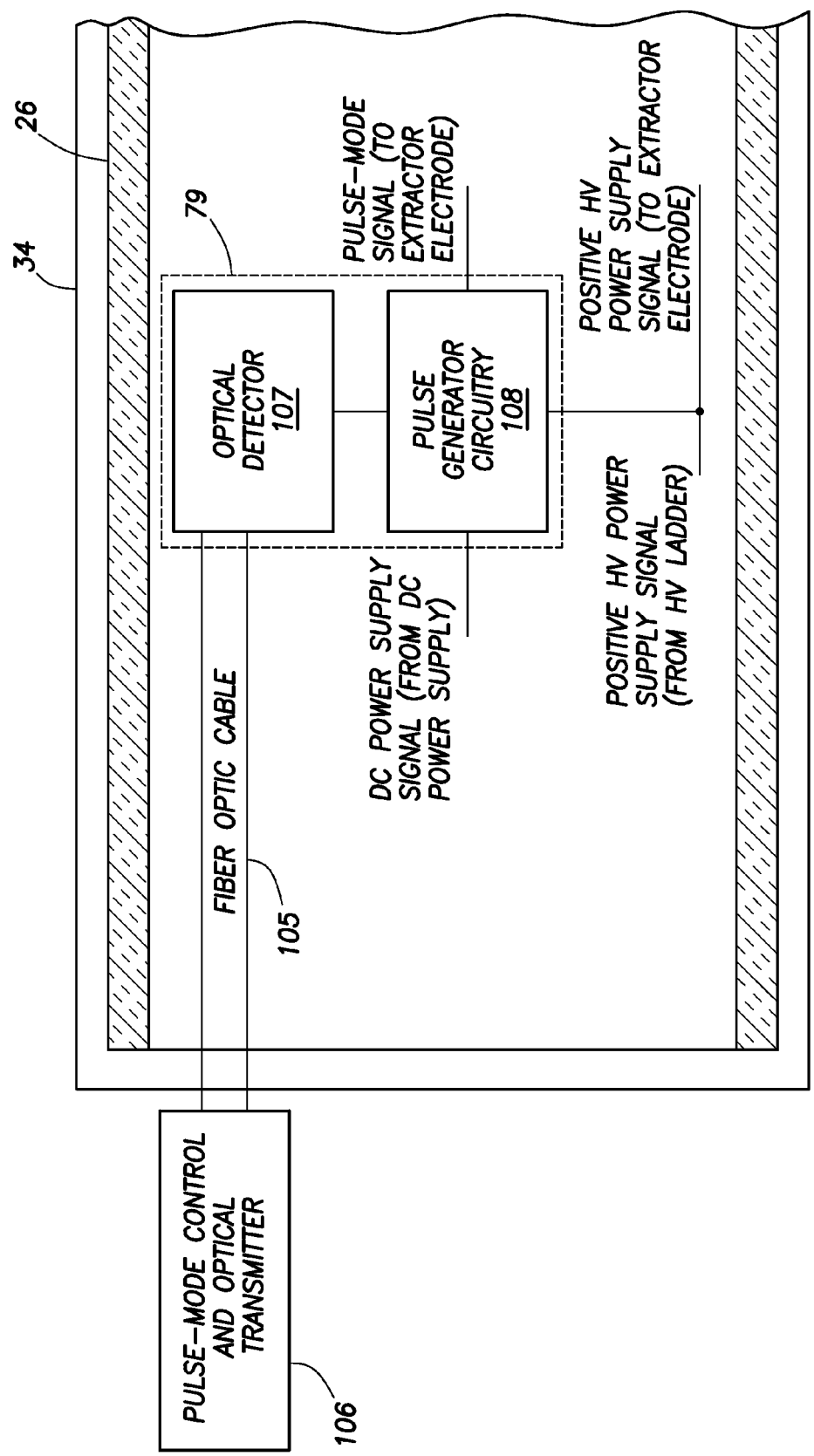
FIG. 8 is a schematic view of an optical interface for interfacing to the high voltage power supply circuitry of FIGS. 1-7B.
Figure 9:
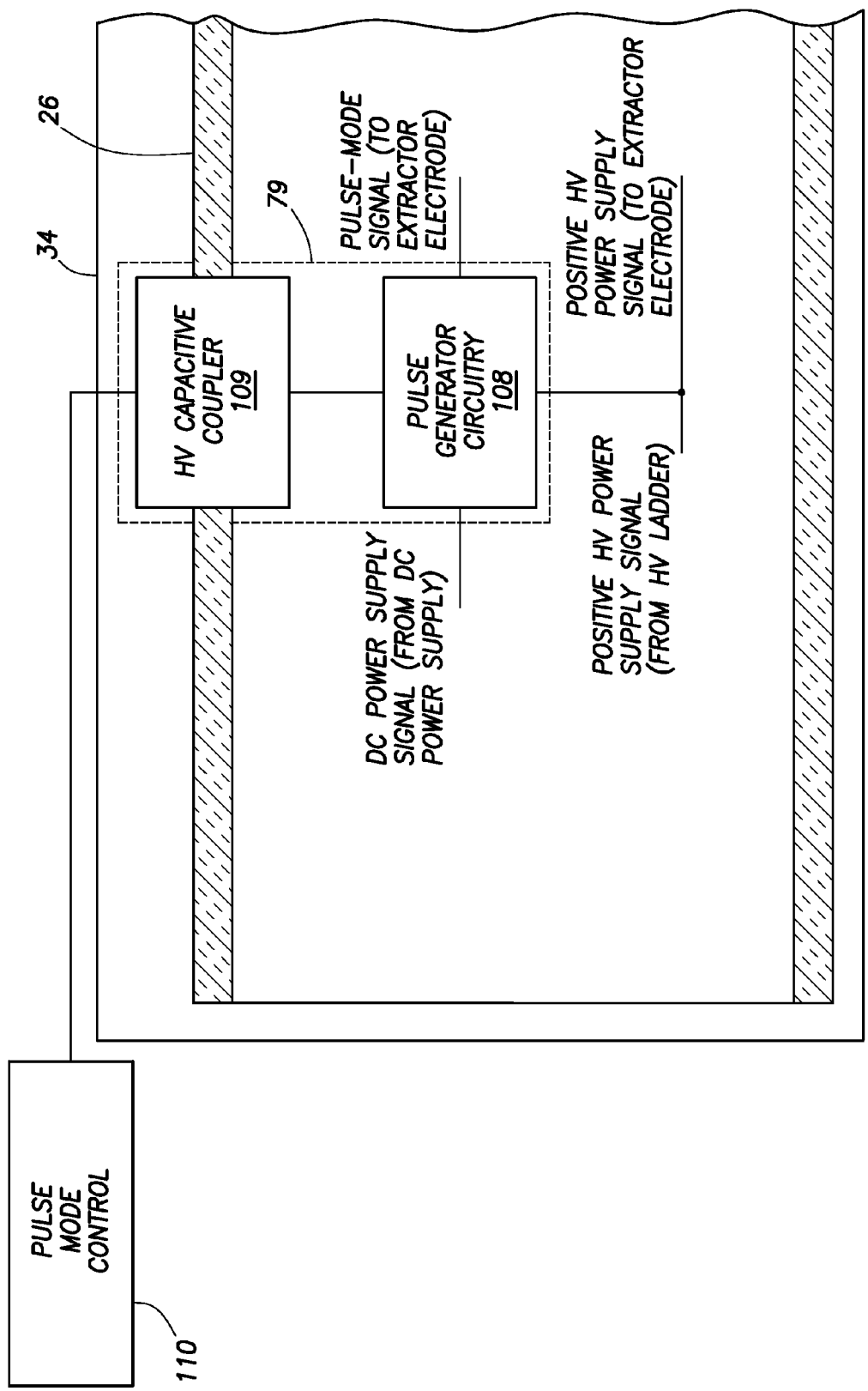
FIG. 9 is a schematic view of a capacitive coupler interface for interfacing to the high voltage power supply circuitry of FIGS. 1-7B.

In the embodiments described herein, the burst rate and durations of the pulsed output signals supplied by the pulsed-mode circuitry 79 to the extractor electrode are controlled by an interface between low voltage control circuitry and the pulsed-mode supply circuitry 79 located with the high voltage environment of the high voltage power supply circuitry 24. This interface can be an optical interface that employs optical control signals. For example, as shown in FIG. 8, the optical interface can be realized by a fiber optic cable 105 located within the high voltage environment (i.e., located within the interior space defined by the high voltage insulation 26). The fiber optic cable 105 carries optical control signals generated by an optical transmitter (e.g., LED or laser diode) as part of low voltage pulse mode control circuitry 106. The pulse mode control circuitry 106 is preferably located outside the NG housing 34. The high voltage pulsed-mode circuitry 79 includes an optical detector 107 that receives the optical control signals generated by the optical transmitter of the control circuitry 106 and carried by the fiber optic cable 105 as well as pulse generator circuitry 108 for generating pulsed output signals in accordance with the optical control signals detected by the optical detector 107. The pulsed output signals generated by circuitry 108 are supplied to the extractor electrode 22. Alternatively, as shown in FIG. 9, a high voltage capacitive coupler 109 can be mounted to the high voltage insulation 26 and used to communicate control signals between low voltage pulse mode control circuitry 110 and the pulsed-mode circuitry 79 of the high voltage power supply 24. In this configuration, the high voltage capacitive coupler 109 provides for communication of control signals from outside to inside the high voltage environment of the high voltage power supply circuitry 24 while maintaining high voltage standoff of the high voltage environment. Other suitable interfaces can be used.

Advantageously, the neutron generator of the present invention employs both a grounded target electrode as well as an RF-driven ion source with an external RF antenna that does not make physical contact with the high voltage sealed environment of the device. The grounded target electrode reduces the need for high voltage insulation of the target electrode. Because most good high voltage insulators provide poor thermal conduction, the reduction or elimination of high voltage insulation for the target electrode facilitates heat removal (cooling). Moreover, with adequate cooling of the grounded target, run away depletion of the target under high beam operation can be avoided, which allows for sustenance of higher neutron output per unit beam current on the target. Furthermore, with the target electrode operating at or near ground potential, problems associated with electron current leakage from the surfaces of the target electrode are avoided. The external nature of the RF antenna of the RF-driven ion source allows for improved high voltage insulation of the ion source and supporting high voltage components. It also allows for the RF signal generator to operate at ground potential. Moreover, the RF-driven ion source produces high monatomic hydrogen beam fractions which yield significantly more neutrons per unit beam current as compared to convention (e.g., Penning-type) ion sources.

Figure 10:
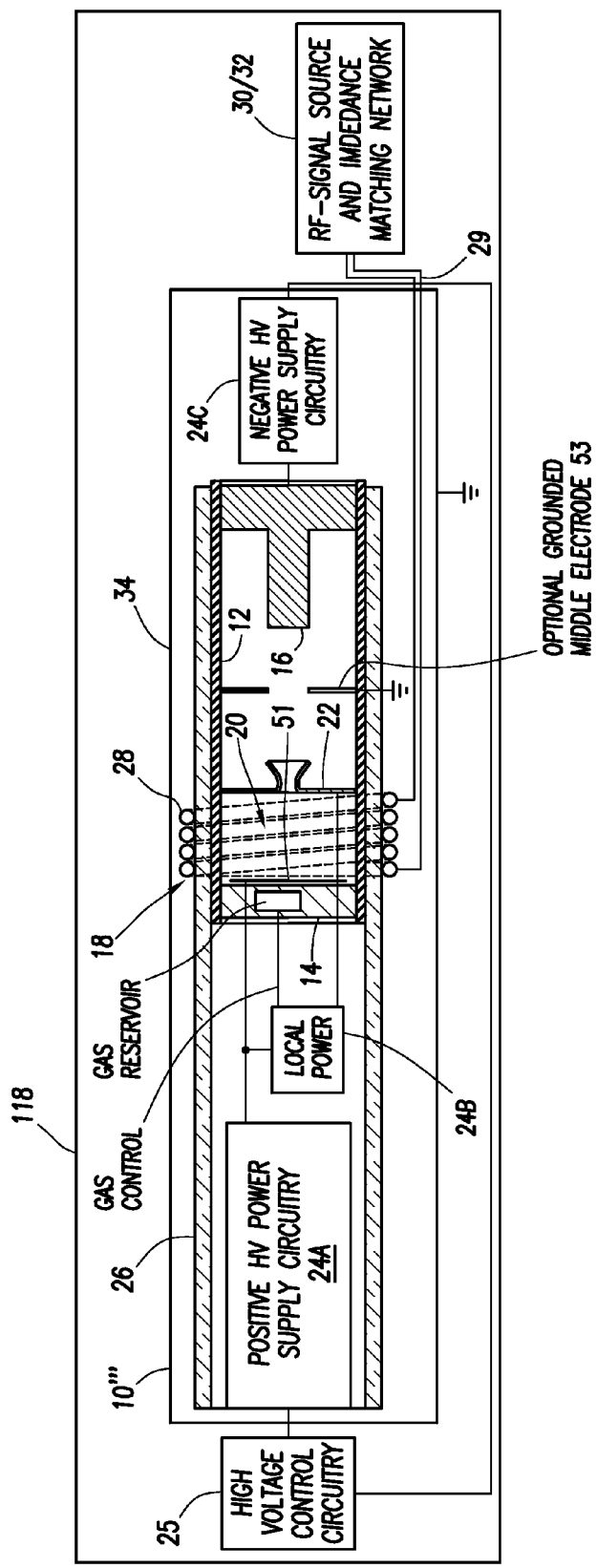
FIG. 10 is a schematic view of a neutron generator of the logging tool of FIG. 1 in accordance with yet another alternate embodiment of the present invention.

In an alternate embodiment as shown in FIG. 10, the extractor electrode 22 (and possibly the plasma electrode 51) of the ion source 18 as well as the target electrode 16 are operated at high voltage potentials. The extractor electrode 22 and possibly the optional plasma electrode 51 are operated at positive high voltage potentials by positive high voltage power supply circuitry 24A and 24B, and the target electrode 16 is operated at negative high voltage potentials by negative high voltage power supply circuitry 24C. The positive high voltage power supply circuitry 24A, 24B is located adjacent the ion-source end of the envelope 12. The negative high voltage power supply circuitry 24C is located adjacent the target end of the envelope 12. The high voltage insulation 26 extends along the lengthwise (axial) dimension of the sealed envelope 12 and beyond the ends of the envelope 12 such that it surrounds the positive high voltage power supply circuitry 24A, 24B and the negative high voltage power supply circuitry 24C for high voltage insulation purposes. The difference between the positive and negative high voltage potentials can be anywhere between 70 and 300 kV or more, while the difference between the positive or negative high voltage potential and ground potential is maintained at less than 35 to about 150 kV. The manner in which the extractor electrode 22 (and possibly the plasma electrode 51) and the RF antenna 28 are operated is similar to that described above. The major change lies in the fact that the target electrode 16 is no longer operated at or near ground potential. Optionally, the cylindrical envelope 12 can be divided in two parts, which are separated by a conductive ground electrode 53, which is connected to ground either directly or indirectly through a sense circuit (not shown). Addition of such a ground electrode 53 reduces the stresses on the envelope 12 and allows the application of a higher total potential. Since the target electrode 16 is no longer operated at or near ground potential, the gas reservoir 41 is supplied with power by an isolated power supply 24B, which is preferably realized as part of the positive high voltage power supply circuitry as shown. Control of the reservoir power supply can be realized by any of the electrically-isolated interfaces described above. While the configuration of FIG. 10 negates some of the advantages of the grounded target configuration, it reduces the high voltage stresses between ground and the high voltage sections of the neutron generator.

There has been described and illustrated herein an embodiment of a neutron generator, a method of operating same as well as a logging tool based thereon. While a particular embodiment of the invention has been described, it is not intended that the invention be limited thereto, as it is intended that the invention be as broad in scope as the art will allow and that the specification be read likewise. Thus, while particular logging tools have been disclosed, it will be appreciated that the neutron generator of the present invention can be used in other logging tools as well as other applications. In addition, while particular configurations have been disclosed in reference to the neutron generator of the present invention, it will be appreciated that other configurations could be used as well. It will therefore be appreciated by those skilled in the art that yet other modifications could be made to the provided invention without deviating from its spirit and scope as claimed.

What is claimed is:

1. A neutron generator comprising:
a target electrode;
a sealed envelope providing an environment for a gas, said sealed envelope defining an ion source chamber bounded by an extraction electrode, said extraction electrode spaced apart from the target electrode;
an RF antenna external to said sealed envelope and disposed in proximity to said ion source chamber, said RF antenna for transmitting time-varying electromagnetic fields within said ion source chamber for producing a plasma in said ion source chamber;
insulation disposed between said RF antenna and said ion source chamber for electrically insulating said RF antenna from voltages of said ion source chamber and said extraction electrode, the insulation comprising a different material than the sealed envelope;
a voltage coupler, wherein the coupler is mounted to the insulation;
wherein said extraction electrode operates at a positive voltage potential less than or equal to a steady state potential of the plasma and said target electrode operates at or near ground potential in order to produce an electric field that accelerates ions of said plasma towards said target electrode to induce collisions of ions with target material, thereby causing fusion reactions that generate neutrons; and
a plasma electrode disposed within the ion source chamber to influence the steady state potential of the plasma so as to aid extraction of the ions through the extraction electrode;
wherein said RF antenna is axially positioned between said extraction electrode and said plasma electrode in relation to an axis formed by the extraction electrode, the plasma electrode, and the target electrode.

2. The neutron generator according to claim 1, wherein:
said RF antenna comprises a coil of tubing with coolant flowing therethrough.

3. The neutron generator according to claim 1, wherein:
said insulation comprises solid-form voltage insulation surrounding said ion source.

4. The neutron generator according to claim 3, wherein:
said solid-form voltage insulation comprises at least one tubular member realized from perfluoroalkoxy.

5. The neutron generator according to claim 3, wherein:
said solid-form voltage insulation comprises two or more concentric tubular members realized from perfluoroalkoxy, each having a wall thickness of at least 0.04 inches.

6. The neutron generator according to claim 3, comprising:
a first housing that houses said sealed envelope, said RF antenna and said solid-form voltage insulation.

7. The neutron generator according to claim 6, wherein:
said solid-form voltage insulation extends between said sealed envelope and said first housing over at least a portion of the lengthwise dimension of said sealed envelope.

8. The neutron generator according to claim 6, wherein:
at least one of liquid-form electrically insulating material and gas-form electrically insulating material fill the space between said sealed envelope and said first housing for electrical insulating purposes.

9. The neutron generator according to claim 6, comprising:
an RF generator, electrically coupled to said RF antenna, for driving said RF antenna, said RF generator including an RF signal source and an impedance matching network.

10. The neutron generator according to claim 9, wherein:
said RF signal generator operates substantially at ground potential and is disposed outside said first housing near said target electrode.

11. The neutron generator according to claim 10, comprising:
voltage supply circuit means, electrically coupled to said extraction electrode, for operating said extraction electrode such that it floats at a positive voltage potential.

12. The neutron generator according to claim 11, wherein:
said voltage supply circuit means comprises a Cockcroft-Walton voltage multiplier circuit.

13. The neutron generator according to claim 11, wherein:
said voltage supply circuit means is disposed within said first housing adjacent or near an end of said sealed envelope opposite said target electrode.

14. The neutron generator according to claim 13, comprising:
solid-form voltage insulation, disposed within said first housing and surrounding said voltage supply circuit means, for electrically insulating said voltage supply circuit means.

15. The neutron generator according to claim 14, wherein:
said solid-form voltage insulation comprises at least one tubular member realized from perfluoroalkoxy.

16. The neutron generator according to claim 14, wherein:
said solid-form voltage insulation comprises at least two concentric tubular members realized from perfluoroalkoxy, each having a wall thickness of at least 0.04 inches.

17. The neutron generator according to claim 14, wherein:
said solid-form voltage insulation is part of a unitary member that surrounds said sealed envelope, said unitary member being part of said insulation.

18. The neutron generator according to claim 6, comprising:
gas supply means for supplying gas to said enclosed envelope, said gas supply means operating at or near ground potential, said gas supply means disposed near said target electrode.

19. The neutron generator according to claim 11, comprising:
control circuitry that interfaces to said voltage supply circuit means, said control circuitry operating at lower voltages than those output by the voltage supply circuit means and disposed outside said first housing.

20. The neutron generator according to claim 19, wherein:
said control circuitry and said RF signal generator provide controlled output of ions in a continuous output mode.

21. The neutron generator according to claim 19, wherein:
said control circuitry and said RF signal generator provide controlled output of ions in a pulsed output mode.

22. The neutron generator according to claim 21, wherein:
said RF signal generator applies pulsed-mode excitation signals to said RF antenna in order to achieve said pulsed output mode.

23. The neutron generator according to claim 21, wherein:
said voltage supply circuit means comprises i) DC power supply circuitry floating at positive voltage potentials and ii) circuitry for generating pulsed output signals from output of said DC power supply circuitry and for outputting said pulsed output signals for supply to said extractor electrode.

24. The neutron generator according to claim 23, comprising:
an interface to couple control circuitry located outside voltage environment of said voltage supply circuit means to the circuitry for generating pulsed output signals.

25. The neutron generator according to claim 24, wherein:
said interface comprises an optical transmitter located outside the voltage environment of said voltage supply circuit means, a fiber optic cable passing through the voltage environment of said voltage supply circuit means and leading to an optical detector located in the voltage environment of said voltage supply circuit means.

26. The neutron generator according to claim 24, wherein:
said interface comprises the voltage coupler, wherein the voltage coupler comprises a voltage capacitive coupler, wherein the voltage capacitive coupler is mounted to the insulation.

27. The neutron generator according to claim 1, wherein:
said RF antenna comprises a coil of wire or tubing in a helix geometry that surrounds said ion source chamber.

28. The neutron generator according to claim 1, wherein:
said RF antenna comprises a coil of wire or tubing in a pancake geometry that is disposed in the vicinity of said ion source chamber.

29. A neutron generator comprising:
a target electrode;
a sealed envelope providing a pressure environment for a gas, said sealed envelope including an ion source chamber bounded by an extraction electrode, said extraction electrode spaced apart from the target electrode;
an RF antenna external to said envelope and disposed in proximity to said ion source chamber, said RF antenna for transmitting time-varying electromagnetic fields within said ion source chamber for producing a plasma in said ion source chamber; and
a plasma electrode disposed within the ion source chamber to influence the steady state potential of the plasma so as to aid extraction of the ions through the extraction electrode;
wherein said extraction electrode operates at a positive voltage potential with respect to ground potential and said target electrode operates at negative with respect to ground potential in order to produce an electric field gradient that accelerates ions of said plasma towards said target electrode to induce collisions of ions with target material, thereby causing fusion reactions that generate neutrons;
insulation disposed between said RF antenna and both said ion source chamber and said extraction electrode, for electrically insulating said RF antenna from voltages of said ion source chamber and said extraction electrode;
a voltage capacitive coupler, wherein the coupler is mounted to the insulation; and
wherein the RF antenna is axially positioned between said extraction electrode and said plasma electrode in relation to an axis formed by the extraction electrode, the plasma electrode, and the target electrode.

30. The neutron generator according to claim 29,
wherein the voltage coupler comprises a voltage capacitive coupler, wherein the voltage capacitive coupler is mounted to the insulation.

31. The neutron generator according to claim 29, wherein:
a portion of said sealed envelope defines said ion source chamber, said insulation comprises said portion of said sealed envelope, and said RF antenna is disposed adjacent said portion of said sealed envelope.

32. The neutron generator according to claim 31, wherein:
said insulation comprises solid-form voltage insulation surrounding said portion of said sealed envelope.

33. The neutron generator according to claim 32, wherein:
said solid-form voltage insulation comprises at least one tubular member realized from perfluoroalkoxy.

34. The neutron generator according to claim 33, wherein:
said solid-form voltage insulation comprises two or more concentric tubular members realized from perfluoroalkoxy, each having a wall thickness of at least 0.04 inches.

35. The neutron generator according to claim 33, comprising:
a first housing that houses said sealed envelope, said RF antenna and said solid-form voltage insulation.

36. The neutron generator according to claim 35, wherein:
said solid-form voltage insulation extends between said sealed envelope and said first housing over at least a portion of the lengthwise dimension of said sealed envelope.

37. The neutron generator according to claim 35, wherein:
at least one of liquid-form electrically insulating material and gas-form electrically insulating material fill the space between said sealed envelope and said first housing for insulating purposes.

38. The neutron generator according to claim 35, comprising:
an RF generator, electrically coupled to said RF antenna, for driving said RF antenna, said RF generator including an RF signal source and an impedance matching network.

39. The neutron generator according to claim 38, wherein:
said RF signal generator operates substantially at ground potential and is disposed outside said first housing near said target electrode.

40. The neutron generator according to claim 39, comprising:
first voltage supply circuit means, electrically coupled to said extraction electrode, for operating said extraction electrode such that it floats at a positive voltage potential; and
second voltage supply circuit means, electrically coupled to said target electrode, for operating said target electrode such that it floats at a negative voltage potential.

41. The neutron generator according to claim 40, wherein:
said first and second voltage supply circuit means each comprise a Cockcroft-Walton voltage multiplier circuit.

42. The neutron generator according to claim 40, wherein:
said first voltage supply circuit means is disposed within said first housing adjacent or near an end of said sealed envelope opposite said target electrode, and said second voltage supply circuit means is disposed within said first housing adjacent or near said target electrode.

43. The neutron generator according to claim 42, comprising:
solid-form voltage insulation, disposed within said first housing and surrounding said first and second voltage supply circuit means, for electrically insulating said first and second voltage supply circuit means.

44. The neutron generator according to claim 43, wherein:
said solid-form voltage insulation comprises at least one tubular member realized from perfluoroalkoxy.

45. The neutron generator according to claim 43, wherein:
said solid-form voltage insulation comprises at least two concentric tubular members realized from perfluoroalkoxy, each having a wall thickness of at least 0.04 inches.

46. The neutron generator according to claim 43, wherein:
said solid-form voltage insulation is part of a unitary member that surrounds said sealed envelope, said unitary member being part of said insulation.

47. The neutron generator according to claim 40, comprising:
gas supply means for supplying gas to said enclosed envelope, said gas supply means operably coupled to said first voltage supply circuit means and operating at a positive voltage potential.

48. The neutron generator according to claim 40, comprising:
control circuitry that interfaces to said first and second voltage supply circuit means, said control circuitry disposed outside said first housing.

49. The neutron generator according to claim 48, wherein:
said control circuitry and said RF signal generator provide controlled output of ions in a continuous output mode.

50. The neutron generator according to claim 48, wherein:
said control circuitry and said RF signal generator provide controlled output of ions in a pulsed output mode.

51. The neutron generator according to claim 50, wherein:
said RF signal generator applies pulsed-mode excitation signals to said RF antenna in order to achieve said pulsed output mode.

52. The neutron generator according to claim 50, wherein:
said voltage supply circuit means comprises i) DC power supply circuitry floating at positive voltage potentials and ii) circuitry for generating pulsed output signals from output of said DC power supply circuitry and for outputting said pulsed output signals for supply to said extractor electrode.

53. The neutron generator according to claim 29, comprising:
an electrode disposed between said extraction electrode and said target electrode and operating at or near ground potential.

* * * * *